(12) United States Patent
Rodniansky (10) Patent No.: US 11,044,236 B2
(45) Date of Patent: Jun. 22, 2021

(54) PROTECTING SENSITIVE INFORMATION IN SINGLE SIGN-ON (SSO) TO THE CLOUD

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 16/295,090

(22) Filed: Mar. 7, 2019

(65) Prior Publication Data

US 2020/0287885 A1    Sep. 10, 2020

(51) Int. Cl.
*H04L 29/06* (2006.01)

(52) U.S. Cl.
CPC .... *H04L 63/0421* (2013.01); *H04L 29/06639* (2013.01); *H04L 63/0815* (2013.01); *H04L 63/0869* (2013.01)

(58) Field of Classification Search
CPC ........... H04L 63/0815; H04L 29/06639; H04L 63/0421; H04W 12/084
See application file for complete search history.

(56) References Cited

U.S. PATENT DOCUMENTS

| | | | |
|---|---|---|---|
| 9,536,065 B2 | 1/2017 | Bouse et al. | |
| 9,760,697 B1 | 9/2017 | Walker | |
| 9,959,397 B1 | 5/2018 | Kvamme et al. | |
| 2017/0155655 A1* | 6/2017 | Spaulding | H04L 9/3226 |
| 2018/0212956 A1* | 7/2018 | Sanganabhatla | H04L 63/18 |

OTHER PUBLICATIONS

Microsoft, "Protecting data and privacy in the cloud," 2014.
Heijmink, "Secure single sign-on," Masters Thesis, Jul. 2015.
"Method of providing anonymous secure user access tokens," Defensive publication, Mar. 2009.
Lodderstedt et al, "OAuth 2.0 threat model and security considerations," Internet Request for Comment (RFC) 6819, Jan. 2013.
"OAuth Security advisory: 2009.1," Apr. 2009, available at https://oauth.net/advisories/2009-1/.
"What is OAuth?" WhatIs.com website, https://searchmicroservices.techtarget.com/definition/OAuth, available 2018.

* cited by examiner

*Primary Examiner* — Huan V Doan
(74) *Attorney, Agent, or Firm* — Jeffrey S. LaBaw; David H. Judson (57) ABSTRACT

A method to protect sensitive information during a single sign-on (SSO) process flow initiated from a client and directed to an authorization server configured to issue an access token upon verification of a credential. The technique leverages a first proxy that monitors a packet flow issued from the authorization server, and a second proxy that monitors a redirect packet flow issued from the client (in response to the packet flow). A message that includes the access token is modified by the first proxy to include a data string, and the modified message is delivered to the client; concurrently, the first proxy provides the data string/access token pair to the second proxy. When the client receives the modified message, it issues a response (that includes the data string) back to a resource server. As the response traverses the second proxy, it removes the data string and re-inserts the access token, and the resulting modified response is forwarded to the resource server.

24 Claims, 7 Drawing Sheets

8e5dfef0-af1c-11e8-b568-
0800200c9a66ffffffffffffffffffffffffffffffffffffffffffffffffffffffffffffffffffffffffffffffffffffffffffffffffffffffffff
ffffffffffffffffffffffffffffffffffffffffffffffffffffffffffffffffffffffffffffffffffffffffffffffffffffffffffffffffffffff
ffffffffffffffffffffffffffffffffffffffffffffffffffffffffffffffffffffffffffffffffffffffffffffffffffffffffffffffffffffff
ffffffffffffffffffffffffffffffffffffffffffffffffffffffffffffffffffffffffffffffffffffffffffffffffffffffffffffffffffffff
ffffffffffffffffffffffffff

FIG. 10

PROTECTING SENSITIVE INFORMATION IN SINGLE SIGN-ON (SSO) TO THE CLOUD

BACKGROUND OF THE INVENTION

Technical Field

This disclosure relates generally to secure authenticated access to resources in a cloud computing environment.

Background of the Related Art

In a traditional client-server authentication model, a client uses its credentials to access resources hosted by a server. With the increasing use of distributed web services and cloud computing, third-party applications often require access to these server-hosted resources. OAuth is an open protocol (Internet Request for Comment (RFC) 5849) that enables users to share their private data among different Web sites along with their credentials while only exposing the data on the original Web site where it is held. In particular, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users. To accomplish this functionality, OAuth introduces to the traditional client-server authentication model a third role, a resource owner. In the OAuth model, the client (which is not the resource owner, but is acting on its behalf) requests access to resources controlled by the resource owner but hosted by the server. In addition, OAuth allows the server to verify not only the resource owner authorization, but also the identity of the client making the request.

In an OAuth data flow, with the approval of a resource owner, an access token may be issued to a third-party client by an authorization server. The third party then uses the access token to access a protected resource hosted by a resource server. A more recent version of the protocol, OAuth 2.0, provides specific authorization flows for web applications, desktop applications, mobile phones, and smart devices.

While these authentication models provide significant advantages, they have known security flaws that can be exploited by malicious actors. One example is an OAuth 2.0 security exploit that was recently implemented in association with cloud-based authentication infrastructure. That infrastructure includes an Identity-as-a-Service (IDaaS) operating as an authentication server for SSO flows to a Desktop-As-A-Service (DaaS) virtual desktop infrastructure, with both the IDaaS and DaaS being cloud-based. In this exploit, a proxy installed in the client's non-trusted security environment intercepted and decrypted data packets originated by the authentication server, thereby exposing the base64-encoded access token. The decoded access token revealed sensitive information, such as user name, email address, first name, given name, family name, multi-factor authentication (MFA) IP address, date and time of authentication, intended AT receipt, as well as the identity of the resource that the user intended to access. Exposure of such information, which includes Personally-Identifiable Information (PII), created a significant security risk, and it authentication infrastructure implemented in such a manner is non-compliant with certain regulatory schemes (e.g., GDPR) that require protection of such sensitive information.

The technique of this disclosure addresses this security exploit.

BRIEF SUMMARY

According to this disclosure, an authentication infrastructure is augmented to implement a method and system to protect sensitive information (including, without limitation, PII) during a Single Sign-On (SSO) process flow initiated from a client and directed to an authorization server that is normally configured to issue an access token upon verification of a credential associated with a client user. The approach herein is configured to operate within a trusted security environment, and it assumes that the client itself executes in an untrusted security environment According to this approach, the authentication infrastructure is augmented to include first and second computing entities, e.g., reverse proxies, that monitor a packet flow issued from the authorization server and directed to the client, as well as a redirect packet flow issued from the client (in response to the packet flow) back to a resource server.

In operation, a first reverse proxy monitoring the authorization server-client traffic flow receives a message that includes the access token. In response, the first reverse proxy replaces the access token with a data string to create a modified message, and forwards the modified message to the client. Preferably, the data string is a random string, and it has a length that is the same as that of the access token to ensure that the protocol semantics remain unaffected by the substitution. Concurrently, the first reverse proxy sends to the second reverse proxy the access token that was removed from the message, together with the associated data string that was replaced into that message. The second reverse proxy receives and stores (caches) the {data string, access token} pair. Upon receiving the modified message, and according to the SSO protocol flow, the client issues a response, typically an HTTP redirect, that includes the data string. This operation is possible because, in a conventional SSO flow, the client normally does not process the access token; thus, substitution of the data string from the access token does not alter the client redirect operation. The response path (between the client and a resource server) is monitored by the second reverse proxy. When the second reverse proxy receives the response, it identifies the data string and performs an operation (e.g., a data store lookup) to identify and retrieve the associated access token, which was previously saved. The second reverse proxy replaces the data string with the access token to create a modified response, and then forwards the modified response onward to the resource server to complete the SSO flow.

According to this approach, the first and second reverse proxies operate within the trusted security environment. Thus, the processing of the message and the response (i.e., the substitution of the data string for the access token, and vice versa) is not revealed to the client. In this manner, the access token and any embedded PII is never exposed to the client, and any exploit adapted to access the message or the client response does not reveal the access token.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
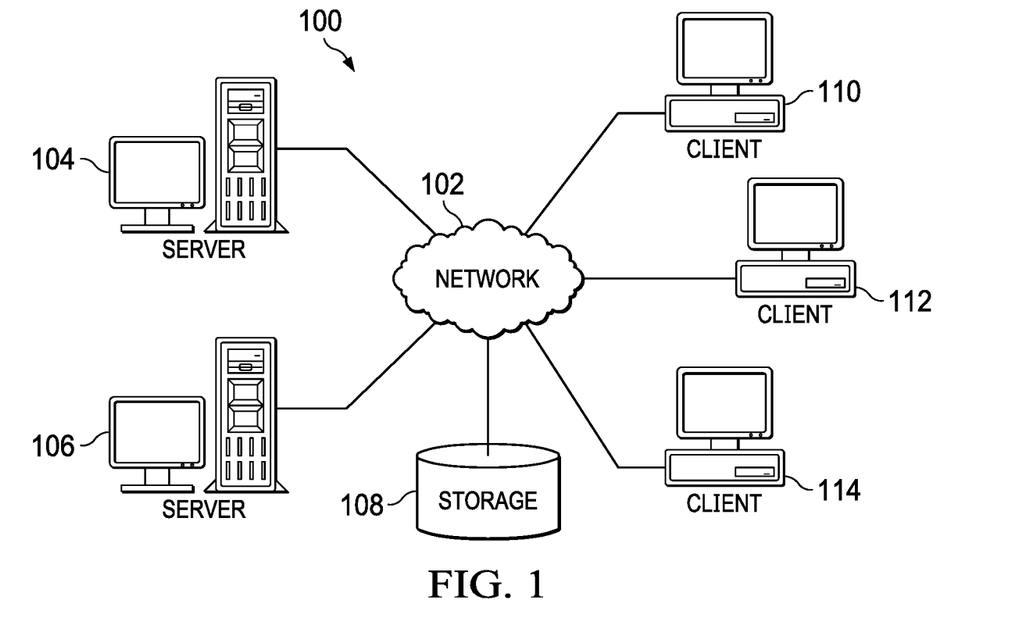
FIG. 1 depicts an exemplary block diagram of a distributed data processing environment in which exemplary aspects of the illustrative embodiments may be implemented.
Figure 2:
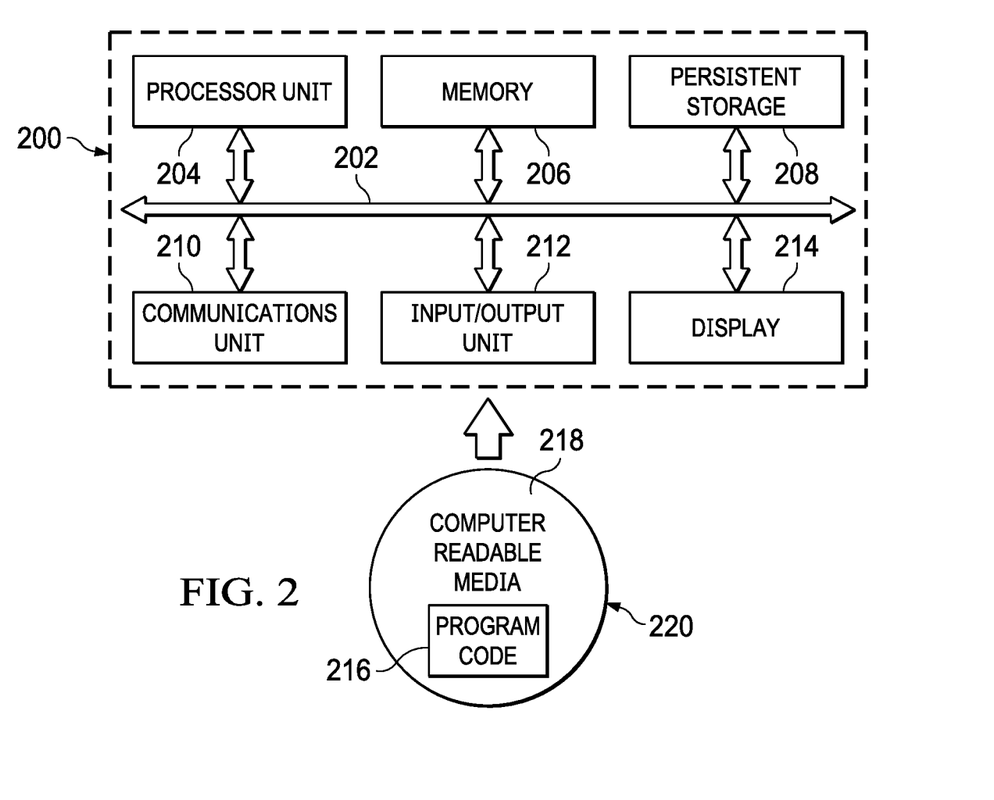
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In Particular, the Following are Typical Characteristics

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models Typically are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models Typically are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
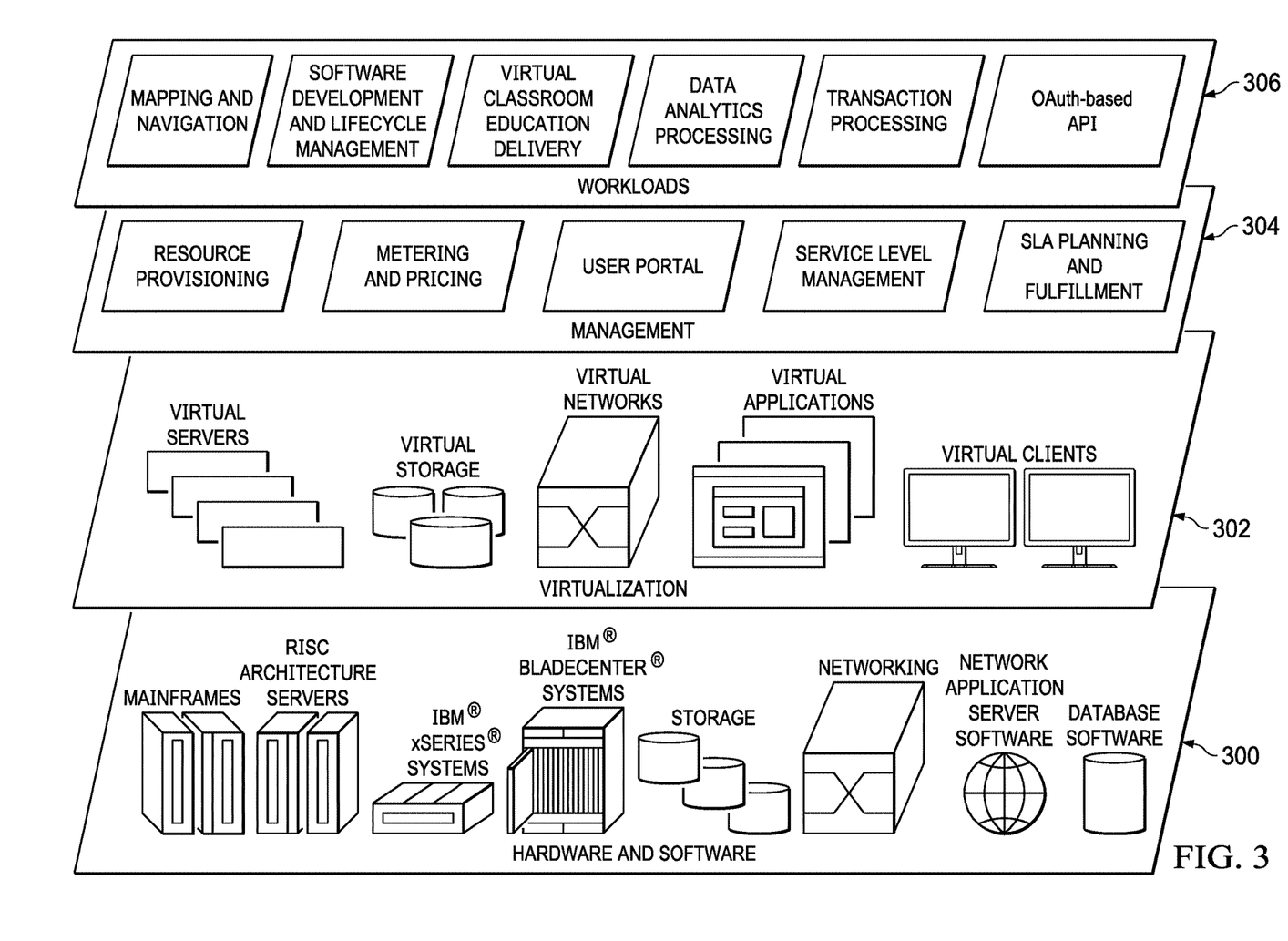
FIG. 3 depicts a known database access monitoring and auditing system.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and OAuth-based integration (for the purposes to be described below).

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
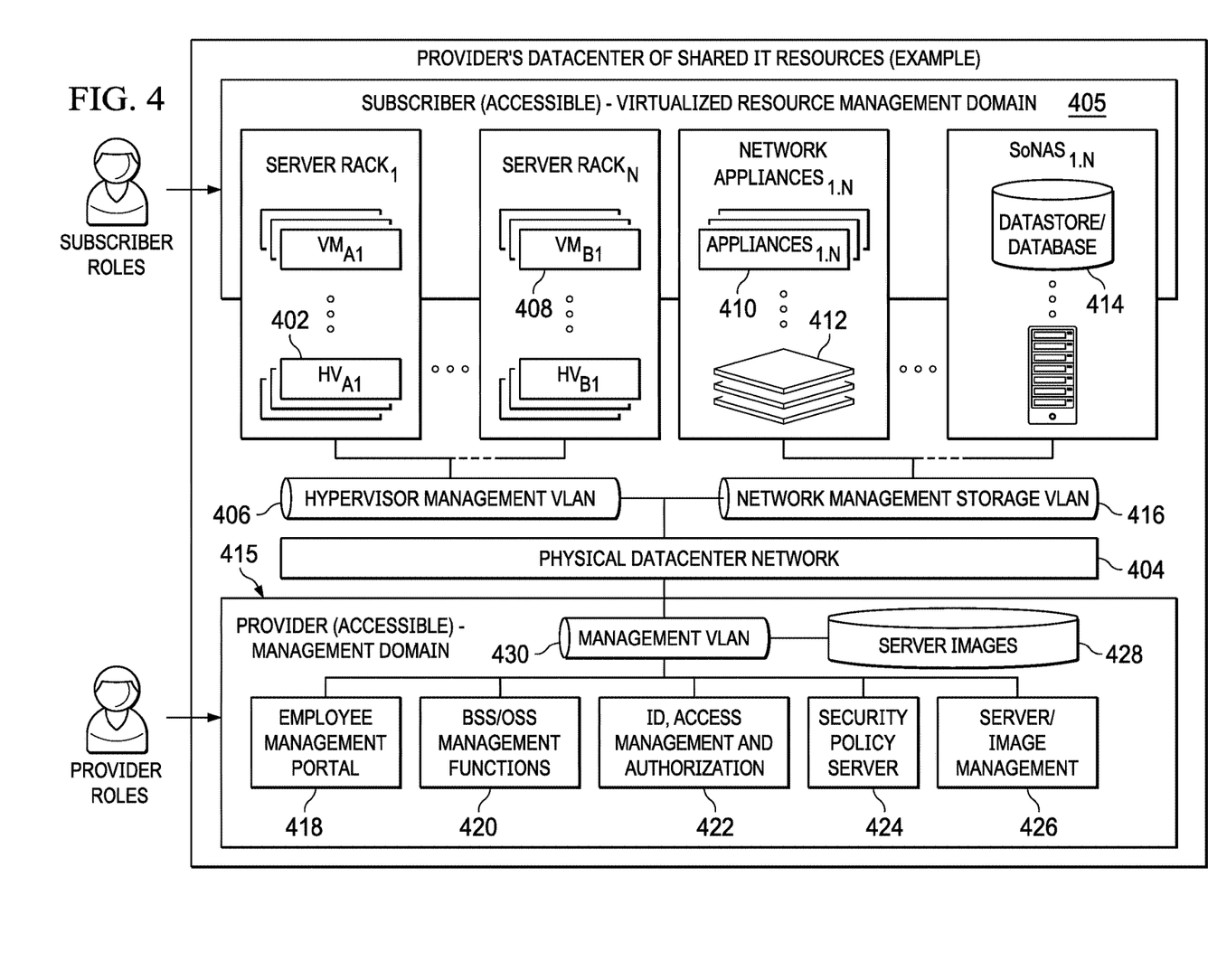
FIG. 4 depicts a representative cloud computing data center in which cloud database services are exposed to cloud database clients.

FIG. 4 illustrates a typical IT infrastructure that supports virtualization of resources and in which the database server(s) are typically housed. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

It is also known in the art to configure or provision cloud architectures such as described above to include mechanisms and systems that operate generally to gather (or otherwise obtain from other data sources) information about available cloud platforms, topologies and capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others.

OAuth and Single Sign-On (SSO)

As described above, OAuth is an open protocol that enables users to share their private data among different Web sites along with their credentials, while only exposing the data on the original Web site where it is held. In particular, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users. To accomplish this functionality, OAuth introduces to the traditional client-server authentication model a third role, called a resource owner. In the OAuth model, the client (which is not the resource owner, but is acting on its behalf) requests access to resources controlled by the resource owner but hosted by the server. In addition, OAuth allows the server to verify not only the resource owner authorization, but also the identity of the client making the request.

Figure 5:
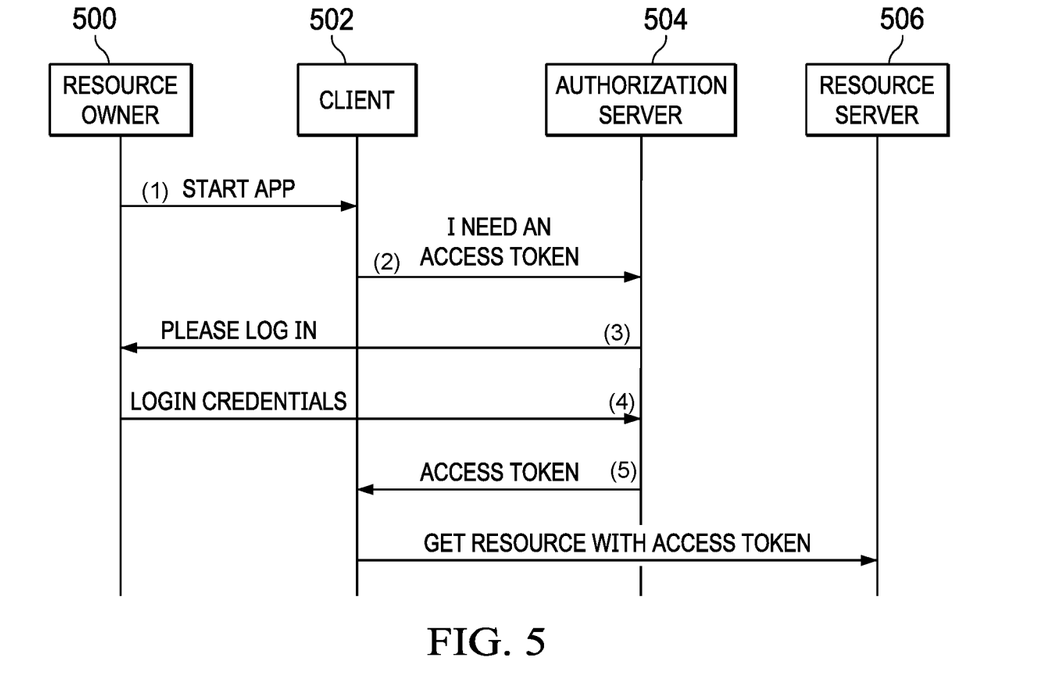
FIG. 5 depicts a typical Single Sign-On (SSO) process flow based on the OAuth 2.0 protocol.

In an OAuth data flow, with the approval of a resource owner, an access token may be issued to a third-party client by an authorization server. The third party then uses the access token to access a protected resource hosted by a resource server. A more recent version of the protocol, OAuth 2.0, provides specific authorization flows for web applications, desktop applications, mobile phones, and smart devices. FIG. 5 depicts a representation of the OAuth 2.0 process flow among a resource owner 500, a client 502, an authorization server 504, and a resource server 506. The authorization server 504 and/or the resource server 506 may be configured in a cloud compute environment such as depicted in FIG. 4. In a typical implementation, the authorization server 504 is implemented "as-a-service" such as Identity-as-a-Service (IDaaS); the resource server 506 is some "Software-as-a-Service" (SaaS), e.g., a Desktop-As-A-Service (DaaS) virtual desktop infrastructure. As will be described below, the technique of this disclosure is implemented without requiring changes to the authorization server or the resource server.

FIG. 5 depicts a simplified representation of the typical SSO process flow. At step (1), the resource owner 500 starts an application that is to be used to access a protected resource hosted or otherwise available from the resource server 506. At step (2), the client 502 issues a request to the authorization server 504 for an access token. The authorization server 504 responds at step (3) by requesting the resource owner 500 to log in. At step (4), the resource owner provides login credentials (e.g., username, password, etc.) to the authorization server 504, which then verifies those credentials. Upon verification, the authorization server 504 at step (5) issues the client 502 the access token. Upon receipt of the access token, the client 502 issues a response (typically an HTTP redirect) to the resource server 506 to request the resource; the access token is passed in the redirect. The resource server 506 then responds by providing the requested resource.

Figure 6:
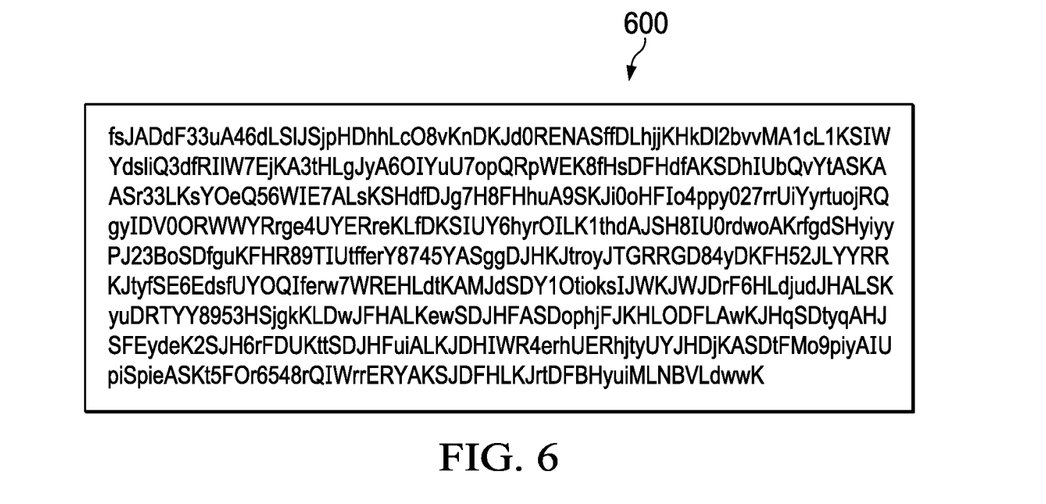
FIG. 6 depicts a representative SSO process access token (AT) that is an encoded base64 string.
Figure 7:
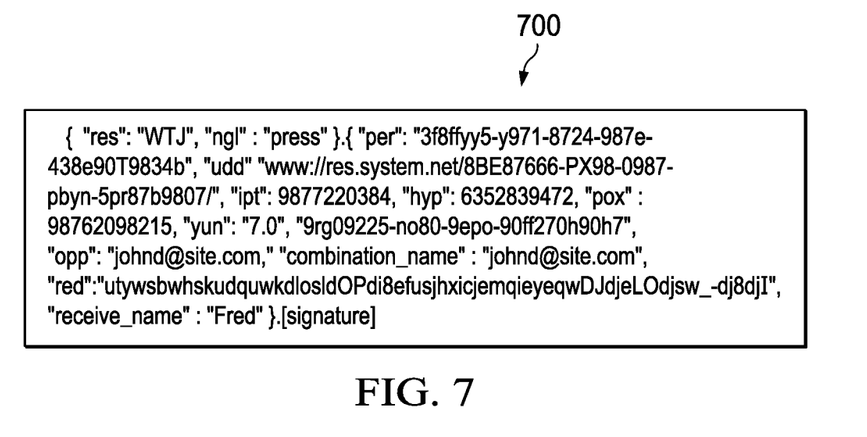
FIG. 7 depicts the AT of FIG. 8 decoded.

The access token typically is encoded. A representative access token 600 is depicted in FIG. 6 as an encoded base64 string. As depicted in FIG. 7, when decoded, however, the access token 700 is exposed as including highly sensitive information including, without limitation, personally-identifiable information (PII), that must be protected against wrongful access, disclosure and use.

Protecting Personally-Identifiable Information in Cloud-Based Single-Sign-On (SSO)

With the above as background, this disclosure provides a system and method to protect sensitive information from being accessed, disclosed and/or used during the SSO process flow. As will be seen, the technique preferably leverages a pair of computing entities (e.g., reverse proxies) selectively positioned within the process flow itself and, in particular, so as to monitor (and, as will be described, to alter) the message traffic that occurs in steps (5) and (6) in the FIG. 5 flow diagram.

Figure 8:
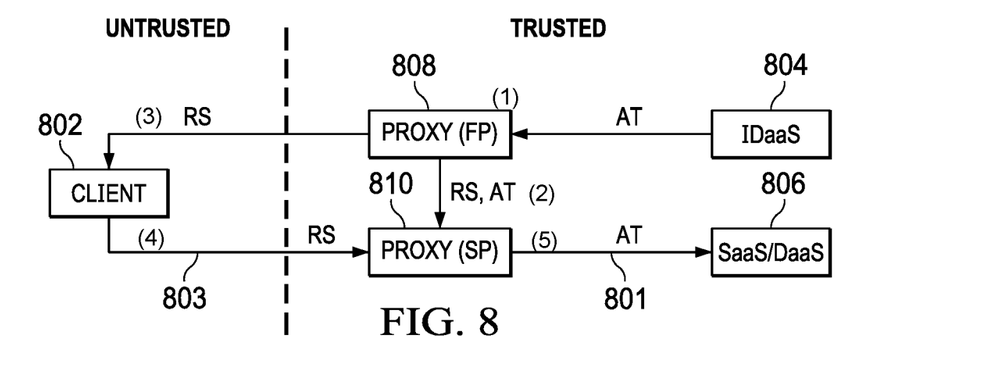
FIG. 8 is a block diagram of a system of this disclosure that is configured to protect sensitive information during the SSO process flow such as shown in FIG. 5.

With reference now to FIG. 8, and according to this disclosure, the authentication infrastructure (such as depicted in FIG. 5) is augmented to implement a method and system to protect sensitive information (including, without limitation, PII) during the Single Sign-On (SSO) process flow initiated from a client 802 and directed to an authorization server (IDaaS 804) that is normally configured to issue an access token upon verification of a credential associated with a client user. As depicted, the approach herein is configured to operate within a trusted security environment 801, and it assumes that the client itself executes in an untrusted security environment 803. As used herein, the notion of being "untrusted" includes an actual untrusted environment, as well as a scenario where the trustworthiness of the client's security environment cannot necessarily be ensured (or known). The trusted security environment, e.g., may be a cloud computing infrastructure such as shown in FIG. 5. As noted above, typically one or both of the authorization server (e.g., IDaaS 804) and resource server (e.g., SaaS/DaaS 806) are configured within the trusted security environment, e.g., the cloud compute infrastructure.

As mentioned above, and according to this approach, preferably the authentication infrastructure is augmented to include the first and second computing entities 808 and 810, e.g., reverse proxies, that monitor a packet flow issued from the authorization server 804 and directed to the client 802, as well as a redirect packet flow issued from the client (in response to the packet flow) back to a resource server 806.

In operation, the first reverse proxy 808 monitoring the authorization server-client traffic flow receives a message that includes the access token. This is shown as step (1). In response, the first reverse proxy replaces the access token with a data string to create a modified message, and forwards the modified message to the client (step (3)). Preferably, the data string is a random string, and it has a length that is the same as that of the access token to ensure that the protocol semantics remain unaffected by the substitution. Concurrently, and as shown as step (2), the first reverse proxy 808 sends to the second reverse proxy 810 the access token that was removed from the message, together with the associated data string that was replaced into that message. The second reverse proxy 810 receives and stores (caches) the {data string, access token} pair. Upon receiving the modified message, and according to the SSO protocol flow, the client 802 issues a response, typically an HTTP redirect, that includes the data string. This is step (4). This operation is possible because, in a conventional SSO flow, the client normally does not process the access token; thus, substitution of the data string from the access token does not alter the client redirect operation. As FIG. 8 depicts, the response path (between the client 802 and a resource server 806) is monitored by the second reverse proxy 810. When the second reverse proxy receives the response, it identifies the data string and performs an operation (e.g., a data store lookup) to identify and retrieve the associated access token, which was previously saved. The second reverse proxy replaces the data string with the access token to create a modified response, and then forwards the modified response onward to the resource server to complete the SSO flow. This is depicted as step (5). This completes the SSO process flow.

As depicted, the first and second reverse proxies 808 and 810 operate within the trusted security environment 801. Thus, the processing of the message and the response (i.e., the substitution of the data string for the access token, and vice versa) is not revealed to the client 802. In this manner, the access token and any embedded PII is never exposed to the client, and any exploit adapted to access the message or the client response does not reveal the access token.

Generalizing, the functionality described above (as implemented by the proxies 808 and 810) may be provided by first and second computing entities, each of which may be a system, device, appliance, program, process, or the like. Depending on implementation, the first and second computing entities may be implemented in a single system or device, e.g., with separate processes then used for monitoring the two (2) flows.

In one embodiment, the reverse proxy functions as described are implemented in software, e.g., as a set of computer program instructions, in a device such as IBM® Guardium® Proxy (with query rewrite). This identification of this commercial product is not intended to be limiting. More generally, the functionality described may be installed and implemented in any production environment independently of the OAuth 2.0 or cloud services.

Figure 10:
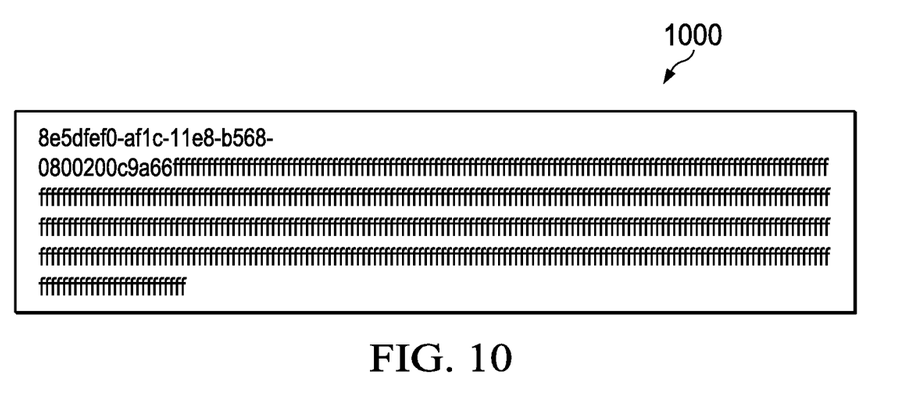
FIG. 10 depicts a representative random data string (RS) that is chosen to replace the AT (e.g., as depicted in FIG. 6) during portions of the SSO process flow according to the technique of this disclosure.

The data string that is substituted for the access token preferably is a random data string (sometimes referred to herein as "RS"). A representative data string RS is a padded globally unique identifier (GUID) 1000 such as depicted in FIG. 10. To ensure the protocol semantics remain unaffected, the RS 1000 has a size that is the same as the AT (600 in FIG. 6). The particular content of the data string is chosen such that if the data string were exposed in the clear it does not disclose any of the information normally carried within the access token (AT) itself.

The data string need not be entirely random, and one or more portions of the string may include some data that is not necessarily random, pseudorandom, etc., provided that no sensitive information (e.g., PII) is included.

Figure 9:
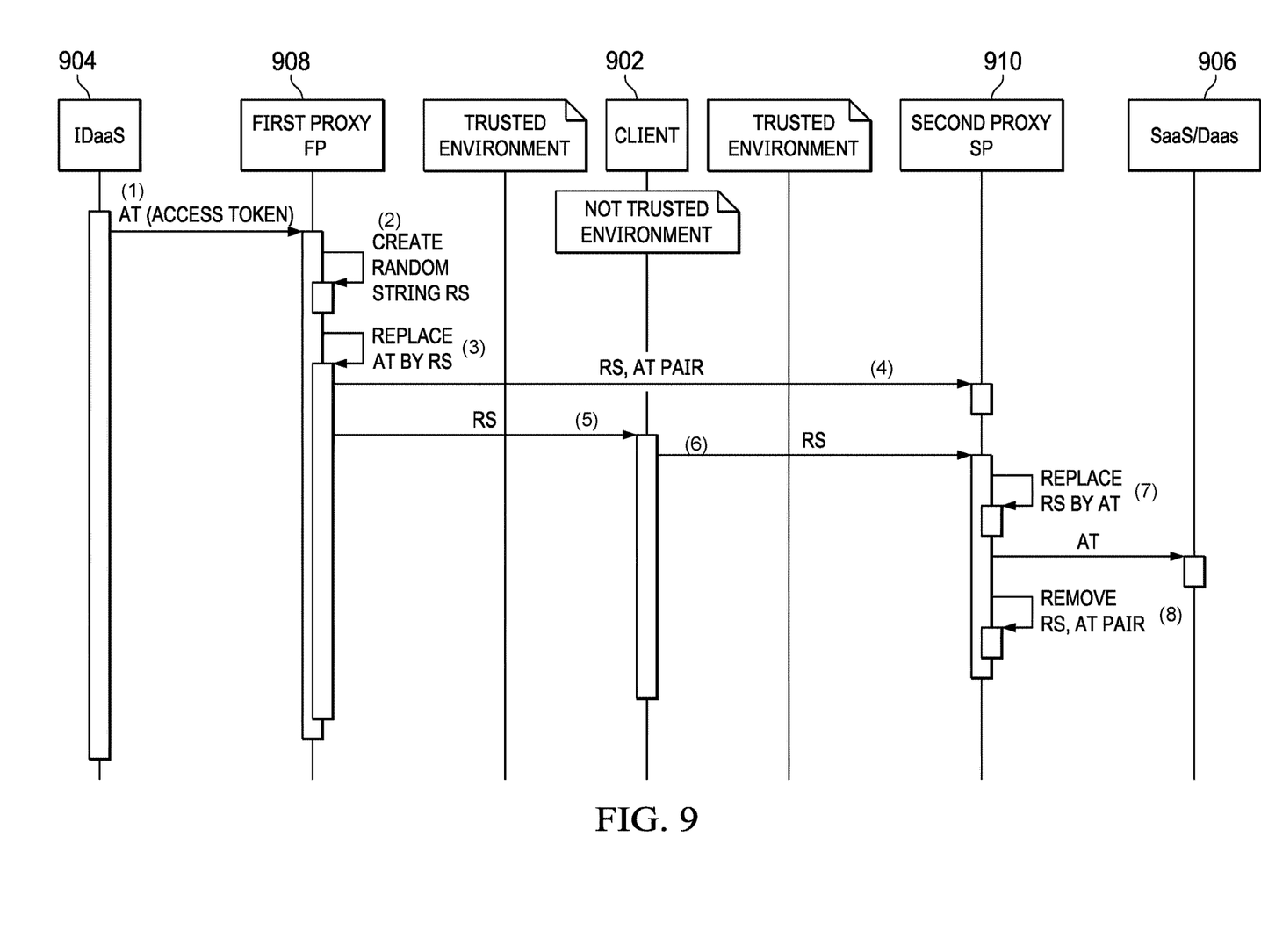
FIG. 9 is a detailed process flow diagram depicting how the technique of this disclosure operates to protect against wrongful disclosure of sensitive information during the SSO process flow.

FIG. 9 depicts the above-described process in additional detail. The portions of the initial SSO process flow (interactions among the resource owner, client and authorization server) are omitted for clarity. At step (1), IDaaS 904 sends access token (AT) to the first reverse proxy (FP) 908. At step (2), first reverse proxy FP 908 creates a random string (RS) having the same size as the access token (AT). At step (3), FP 908 replaces AT with RS in the IDaaS protocol packet (to create a modified protocol packet). At step (4), FP sends RS together with AT to the second reverse proxy (SP) 910, which caches the {RS, AT} pair, e.g., in a data store. At step (5), the first reverse proxy FP 908 forwards to the client 902 the modified protocol packet that includes RS in lieu of AT. Steps (4) and (5) may occur at the same time. At step (6), the client 902 sends a resource server (e.g., SaaS/DaaS) protocol packet with RS to the second reverse proxy SP 910. Typically, this occurs in an HTTP redirect response to the message originally sent by the authorization server. At step (7), SP 910 looks up RS in the {RS, AT} data store, finds the associated AT, substitutes AT into the protocol packet, and forwards the modified protocol packet (with AT) to the resource server 906. At step (8), SP 910 removes the {RS, AT} pair from the data store; accordingly, AT cannot be used again without a new IDaaS authentication.

The above-described scheme ensures that the access token AT is not available in the client's untrusted computing environment and, as noted above, that the same AT cannot be re-used without IDaaS user authentication.

Preferably, RS differs even in a scenario where the AT is being reused. As noted above, RS is the same size as AT to ensure that the SaaS/DaaS packet structure is not affected by the technique and, in particular, that AT and RS replacement and re-insertion occurs without impacting protocol and delivery semantics.

Summarizing, and according to the illustrative embodiment, preferably a pair of proxies are installed in (or otherwise made available from computing resources in) a trusted security system environment. Preferably, each proxy is configured as an external security reverse proxy. The first reverse proxy (FP) is configured to receive the AT sent by IDaaS to the client. FP also is configured to create a random string (RS). In particular, FP replaces AT with RS in a protocol packet and forwards the packet to the client. Concurrently, FP also sends RS along with AT to the second reverse proxy (SP). SP caches the RS, AT pair. In response to receiving the packet with RS, the client issues a response (typically, the HTTP redirect). SP receives the protocol packet with RS sent by the client to the cloud service. SP extracts RS and replaces it with AT. SP then forwards the protocol packet with AT to the cloud service and removes the cached RS, AT pair from its data store.

The technique provides significant advantages. In particular, because the client receives RS instead of AT, unauthorized programs or users in the client's environment that are not trusted are unable to access AT content or to otherwise reuse AT. This approach does not require any protocol amendments or changes to third-party applications.

The access token (AT) herein typically is user-specific, but the technique described may be used with more generic token(s). Further, the data string substitution technique may be used to protect other types of data.

In a representative, but non-limiting, implementation, a representative cloud service is LotusLive, and the identity provider (IdP) is implemented in Tivoli Federated Identity Manager (TFIM). These products and services are available from IBM Corporation, of Armonk, N.Y.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a cloud service. The above-described technique also may be implemented to enable user impersonation by a trusted service to other services, e.g., a web application, an operating system application programming interface (API) call, or the like More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, and as noted above, the identity provider and the described "impersonation" function is implemented in software, which includes but is not limited to firmware, resident software, microcode, and the like. The "token" may be any generic data string or structure that can be transported over a link and/or stored in a data store, such as computer memory.

Furthermore, the user impersonation/delegation functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the identity provider components are implemented in a special purpose computer, preferably in software executed by one or more processors. The software also is maintained in one or more data stores or memories associated with the one or more processors, and the software may be implemented as one or more computer programs.

The user impersonation/delegation function may be implemented as an adjunct or extension to an existing security (authentication) service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

What is claimed is as follows:

1. A method to protect sensitive information during a single sign-on (SSO) flow initiated from a client and directed to an authorization server, wherein the client executes in an untrusted security environment, comprising:
receiving a message that includes an access token, the access token having been issued by the authorization server upon verification of a credential associated with a client user;
responsive to receiving the message, replacing the access token with a data string to create a modified message, and forwarding the modified message to the client;
saving the data string and the access token;
subsequently receiving from the client a response to the modified message, the response including the data string; and responsive to receiving the response, identifying the data string as being associated with the access token, replacing the data string with the access token to create a modified response, and forwarding the modified response to a resource server;

wherein the message and the response are processed within a trusted security environment.

2. The method as described in claim 1 wherein the data string is a random string.

3. The method as described in claim 2 wherein the random string has a same size as the access token.

4. The method as described in claim 1 wherein the SSO flow is an OAuth 2.0 access flow.

5. The method as described in claim 1 wherein the data string and the access token are cached in a data store.

6. The method as described in claim 5 wherein the message is received and processed by a first computing entity, and wherein the response is received and processed by a second computing entity distinct from the first computing entity.

7. The method as described in claim 6 wherein each of the first and second computing entities is a reverse proxy, and wherein the data store is associated with the second computing entity.

8. The method as described in claim 1 wherein one of the authorization server and the resource server are located in a cloud computing environment.

9. Apparatus, comprising:
   at least one hardware processor;
   computer memory holding computer program instructions executed by the at least one hardware processor to protect sensitive information during a single sign-on (SSO) flow initiated from a client and directed to an authorization server, wherein the client executes in an untrusted security environment, the computer program instructions comprising program code configured to:
      receive a message that includes an access token, the access token having been issued by the authorization server upon verification of a credential associated with a client user;
      responsive to receiving the message, replace the access token with a data string to create a modified message, and forward the modified message to the client;
      save the data string and the access token;
      subsequently receive from the client a response to the modified message, the response including the data string; and
      responsive to receiving the response, identify the data string as being associated with the access token, replace the data string with the access token to create a modified response, and forward the modified response to a resource server;
      wherein the message and the response are processed within a trusted security environment.

10. The apparatus as described in claim 9 wherein the data string is a random string.

11. The apparatus as described in claim 10 wherein the random string has a same size as the access token.

12. The apparatus as described in claim 9 wherein the SSO flow is an OAuth 2.0 access flow.

13. The apparatus as described in claim 9 further including program code configured to cache the data string and the access token in a data store.

14. The apparatus as described in claim 13 wherein the program code configured to receive and process by the message comprise a first computing entity, and the program code configured to receive and process the response comprise a second computing entity distinct from the first computing entity.

15. The apparatus as described in claim 14 wherein each of the first and second computing entities is a reverse proxy, and wherein the data store is associated with the second computing entity.

16. The apparatus as described in claim 9 wherein one of the authorization server and the resource server are located in a cloud computing environment.

17. A computer program product comprising a non-transitory computer-readable medium for use in a data processing system, the computer program product holding computer program instructions executed by the data processing system to protect sensitive information during a single sign-on (SSO) flow initiated from a client and directed to an authorization server, wherein the client executes in an untrusted security environment, the computer program instructions comprising program code configured to:
   receive a message that includes an access token, the access token having been issued by the authorization server upon verification of a credential associated with a client user;
   responsive to receiving the message, replace the access token with a data string to create a modified message, and forward the modified message to the client;
   save the data string and the access token;
   subsequently receive from the client a response to the modified message, the response including the data string; and
   responsive to receiving the response, identify the data string as being associated with the access token, replace the data string with the access token to create a modified response, and forward the modified response to a resource server;
   wherein the message and the response are processed within a trusted security environment.

18. The computer program product as described in claim 17 wherein the data string is a random string.

19. The computer program product as described in claim 18 wherein the random string has a same size as the access token.

20. The computer program product as described in claim 17 wherein the SSO flow is an OAuth 2.0 access flow.

21. The computer program product as described in claim 17 further including program code configured to cache the data string and the access token in a data store.

22. The computer program product as described in claim 21 wherein the program code configured to receive and process by the message comprise a first computing entity, and the program code configured to receive and process the response comprise a second computing entity distinct from the first computing entity.

23. The computer program product as described in claim 22 wherein each of the first and second computing entities is a reverse proxy, and wherein the data store is associated with the second computing entity.

24. The computer program product as described in claim 17 wherein one of the authorization server and the resource server are located in a cloud computing environment.

\* \* \* \* \*